United States Patent
Dandu et al.

(10) Patent No.: US 9,835,714 B2
(45) Date of Patent: Dec. 5, 2017

(54) CIRCUIT AND METHOD FOR IMPEDANCE DETECTION IN MILLIMETER WAVE SYSTEMS

(71) Applicant: Texas Instruments Incorporated, Dallas, TX (US)

(72) Inventors: Krishnanshu Dandu, Allen, TX (US); Brian P. Ginsburg, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 316 days.

(21) Appl. No.: 14/682,629

(22) Filed: Apr. 9, 2015

(65) Prior Publication Data

US 2016/0299215 A1    Oct. 13, 2016

(51) Int. Cl.
| | |
|---|---|
| G01S 7/285 | (2006.01) |
| G01S 7/40 | (2006.01) |
| G01S 13/42 | (2006.01) |
| G01S 13/02 | (2006.01) |

(52) U.S. Cl.
CPC .......... *G01S 7/4008* (2013.01); *G01S 7/4026* (2013.01); *G01S 13/426* (2013.01); *G01S 2013/0254* (2013.01)

(58) Field of Classification Search
CPC .............................. G01S 7/4008; G01S 7/4026
USPC ..................................... 342/147, 357.62, 368
See application file for complete search history.

(56) References Cited

U.S. PATENT DOCUMENTS

| | | | |
|---|---|---|---|
| 7,006,041 B2 * | 2/2006 | Fujii ..................... | H01Q 1/246 342/368 |
| 7,271,576 B1 * | 9/2007 | O'Harra, II ........... | G01R 27/04 324/73.1 |
| 2010/0233972 A1 * | 9/2010 | Kashiwagi ........... | H04B 1/0057 455/77 |
| 2010/0277369 A1 * | 11/2010 | Gunton .................. | H01P 5/184 342/368 |
| 2011/0140953 A1 * | 6/2011 | Lynam ................ | G01S 13/4409 342/153 |
| 2013/0076453 A1 * | 3/2013 | Lai ........................ | H01P 1/184 333/161 |
| 2015/0009068 A1 * | 1/2015 | Gregoire ................. | H01Q 3/34 342/365 |

* cited by examiner

*Primary Examiner* — Marcus E Windrich
(74) *Attorney, Agent, or Firm* — Ronald O. Neerings; Charles A. Brill; Frank D. Cimino

(57) ABSTRACT

A method for determining the complex impedance between a first stage and a second stage in a microwave system includes detecting an incident signal emitted by the first stage and detecting a reflected signal reflected from the second stage. The magnitudes of the incident signal and the reflected signal are measured. The detected incident signal is phase shifted by a first angle to yield a first incident signal and the detected reflected signal is phase shifted by the first angle to yield a first reflected signal. The detected incident signal and the first incident signal are mixed with the detected reflected signal and the first reflected signal. The angle of the reflection coefficient is determined based on the mixing and the magnitudes of the incident signal and the reflected signals.

21 Claims, 3 Drawing Sheets

CIRCUIT AND METHOD FOR IMPEDANCE DETECTION IN MILLIMETER WAVE SYSTEMS

BACKGROUND

Beamforming radars have the ability to focus their transmission and receiver beam in a particular direction. Side to side direction is commonly referred to as the azimuth and up and down direction is commonly referred to as the elevation. Beamforming can be used to focus the beam of the radar over both azimuth and elevation. Some beamforming radars have an active electronically scanned array (AESA), which is an electronically steerable beam. The AESA allows very rapid steering of the radar beam, which is known as "beamforming".

An AESA has many small antennas or individual antenna elements arranged in an antenna array. Each antenna element has a transmit module and a receive module. Therefore, each antenna element can individually vary the phase and magnitude of both the receive and the transmit signals. These variations, particularly in phase, provide for the beam to be steered in both azimuth and elevation. Ideally, all the antenna elements steer their individual portions of the beam in the same direction. Only when the receive signal arrives in-phase across all the antenna elements will the maximum signal be received, meaning that the antenna elements are steering the beam in the same direction. The same phase criteria are required for the transmit signal to generate the maximum transmission signal. The steering provides the ability to "aim" the main lobe of the antenna in a desired direction so that all the individual transmit and receive signals are aimed along the main lobe. The process is reciprocal, meaning that the same antenna lobe pattern will exist for both receive and transmit signals.

Each antenna element must have a delay, or phase adjustment, such that after a phase adjustment, all the antenna elements direct the beam in the same azimuth and elevation directions. If the azimuth angle and elevation angle are both zero, then all the antenna elements transmit and receive the signals simultaneously, and no phase adjustment is necessary. At non-zero angles, each antenna element has a phase adjustment to provide alignment of the wave front across the antenna array. Once the input from each antenna element is processed, each antenna input is phase-adjusted by the correct amount so that the wave front arriving from a given direction is aligned. This alignment provides for the signals transmitted by the antenna elements to also be aligned in the same direction.

Because the azimuth and elevation angles of the transmitted signals are dependent on the phase of the transmitted signals, any change in the impedances presented to the output stages of a beamforming radar can lead to variations in the directions of individual transmitted signals. Additionally, the impedance variations can lead to changes in the magnitudes of the individual transmitted signal. The variations in impedances can occur due to a variety of causes such as breaks/shorts in ball or package interfaces in IC applications or a host of other variables.

SUMMARY

A method for determining a complex impedance between a first stage and a second stage in a microwave system includes detecting an incident signal emitted by the first stage and detecting a reflected signal reflected from the second stage. The magnitudes of the incident signal and the reflected signal are measured. The detected incident signal is phase shifted by a first angle to yield a first incident signal and the detected reflected signal is phase shifted by the first angle to yield a first reflected signal. The detected incident signal and the first incident signal are mixed with the detected reflected signal and the first reflected signal. The angle of the reflection coefficient is determined based on the mixing and the magnitudes of the incident signal and the reflected signals.

DETAILED DESCRIPTION

Figure 1:
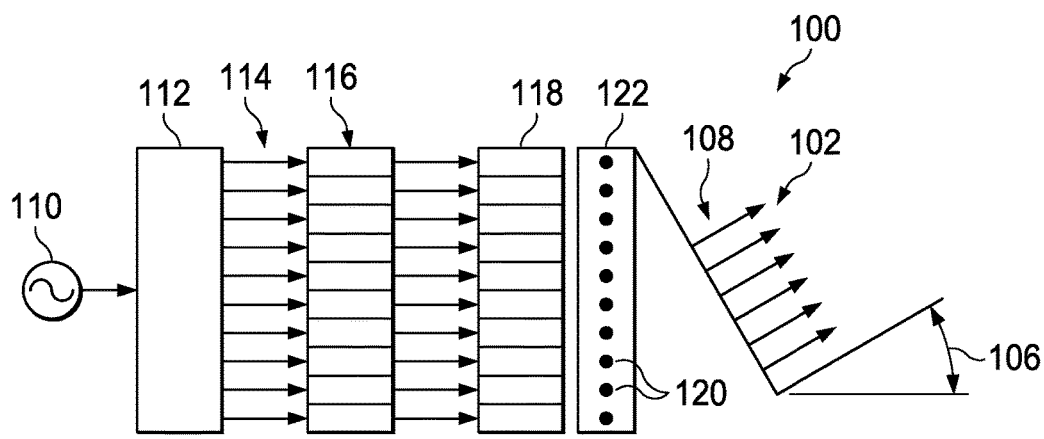
FIG. 1 is a block diagram of a beamforming radar.

FIG. 1 is a block diagram of a beamforming radar 100. The radar 100 electrically moves a beam 102 in both azimuth and elevation. The view of FIG. 1 is a side view, so the beam 102 is illustrated as being movable solely in elevation noted by an angle 106. The beam 102 is composed of a plurality of individual signals 108, wherein the beam 102 is movable by varying the phases of the individual signals 108 as described below.

The radar 100 includes a signal generator 110 that generates a transmission signal, which is transmitted via the beam 102. The signal generator 110 is coupled to a signal splitter/divider 112 that splits the signal 102 into individual transmission signals 114 corresponding to each of the individual signals 108 in the beam 102. In some embodiments, the individual signals are generated by a plurality of individual signal generators and not by the single signal generator 110. The transmission signals 114 are input to a plurality of phase shifters 116 that shift the phase of each of the transmission signals 114 to obtain the proper azimuth and elevation angles for the beam 108. More specifically, the individual signals 108 in the beam 102 are parallel to each other to provide the equivalent of a single signal incident with a target (not shown).

The phase shifters 116 are coupled to a plurality of output stages 118 so that each of the transmission signals 114 are amplified as necessary to drive individual antenna elements 120. The antenna elements 120 are formed into an antenna array 122, which may be a flat surface. The phase shifts on the individual transmission signals 114 result in a specific delay in each of the transmission signals 114 in the time domain. Accordingly, the delays cause the individual transmission signals 108 to be steered to a specific direction.

Figure 2:
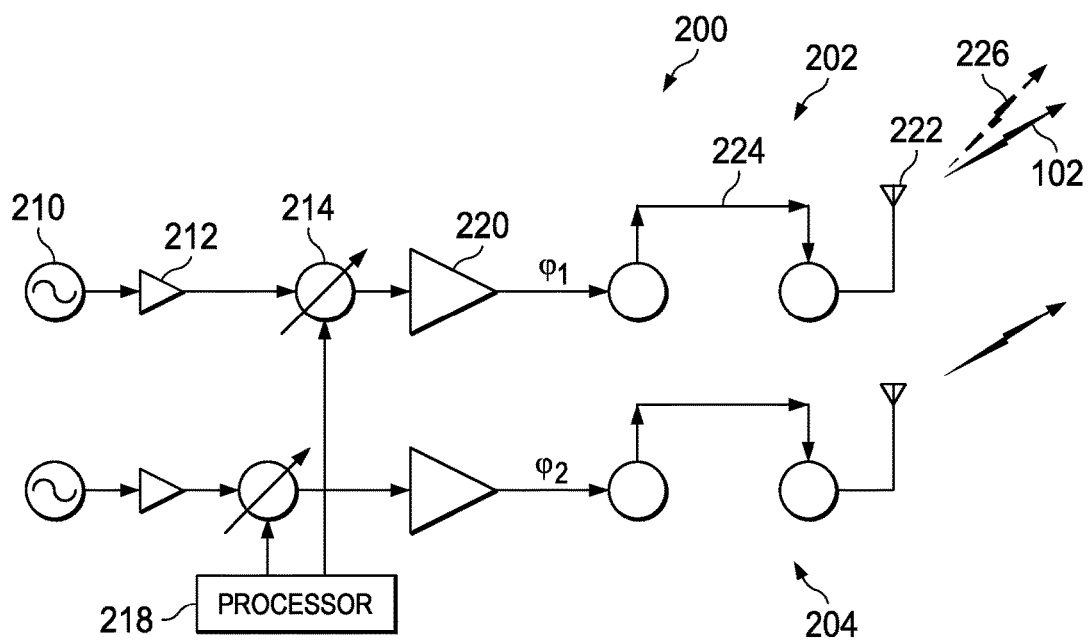
FIG. 2 is a schematic diagram of two transmission signals in the radar of FIG. 1.

The radar 100 is described in greater detail with reference to FIG. 2, which is a circuit 200 having two transmitter signal circuits 202 and 204. Both transmitter circuits 202 and 204 are the same, so the following description of the transmitter circuit 202 applies to the transmitter circuit 204. Some embodiments of the circuit 200 may have different components or a different arrangement of components per design choice. The transmitter circuit 202 includes a signal source 210 that generates the transmission signal transmitted by the transmitter circuit 202. In some embodiments, both transmitter circuits 202 and 204 receive the same transmission signal from a single signal source. The signal source 210 is coupled to a driver 212 that boosts or amplifies the transmission signal. The driver 212 is coupled to a phase shifter 214 that may be identical or substantially similar to one of the phase shifters 116, FIG. 1. The phase shifter 214 is a variable phase shifter that is controlled by a processor 218. The processor 218 determines the phase shift applied to all the individual transmission signals in order to steer the beam 102.

The phase shifter 214 is coupled to a power amplifier 220 that amplifies the transmission signal for transmission by an antenna element 222. The power amplifier 220 is sometimes referred to as an output stage. A transmission line 224 couples the power amplifier 220 to the antenna element 222. The transmission line 224 may be a single element or it may include several elements. In some embodiments, at least one portion of the transmission line 224 is fabricated onto a die of an integrated circuit, wherein the transmission signal conducts through a ball grid array or other conductive device on the die. Any impedance mismatch between the power amplifier 220 and the antenna element 222 can change the magnitude and shift the phase of the transmission signal and cause the beam emitted from the antenna element 222 to be displaced. In addition, phase shifts and magnitude variations in the impedance mismatch can change the beam shape, particularly in the sidelobes. Furthermore, the magnitude variations impact the range of the radar. Accordingly, the beam emitted from the antenna element 222 will not be incident to an intended target if there is an impedance mismatch between the power amplifier 220 and the antenna element 222. An example of such an error is shown by the beam 226 indicated by the dashed line. As shown, the beam 226 is not parallel to the beam 102, which effectively yields the beam 226 nonfunctional and weakens the beam 102.

Several anomalies or the like can cause an impedance mismatch, which leads to the misdirected beam 226. These impedance mismatches will affect any device operating in the microwave range wherein a first stage is to be matched to a second stage. For example, in some embodiments, a die having a ball grid array attachment mechanism may fail wherein a ball may fail to conduct properly. Such a failure can cause a change in the phase without affecting the magnitude of the transmission signal. Likewise, other conducting nodes may fail or have a change in impedance that causes a phase shift in the transmission signal. The change in impedance can cause a reflected wave to reflect from the antenna 222 without changing the magnitude of the reflection coefficient $\Gamma$. Therefore, complex impedance measurements are required to measure the impedance between the power amplifier 220 and the antenna 222 to determine whether impedance mismatches have occurred.

Figure 3:
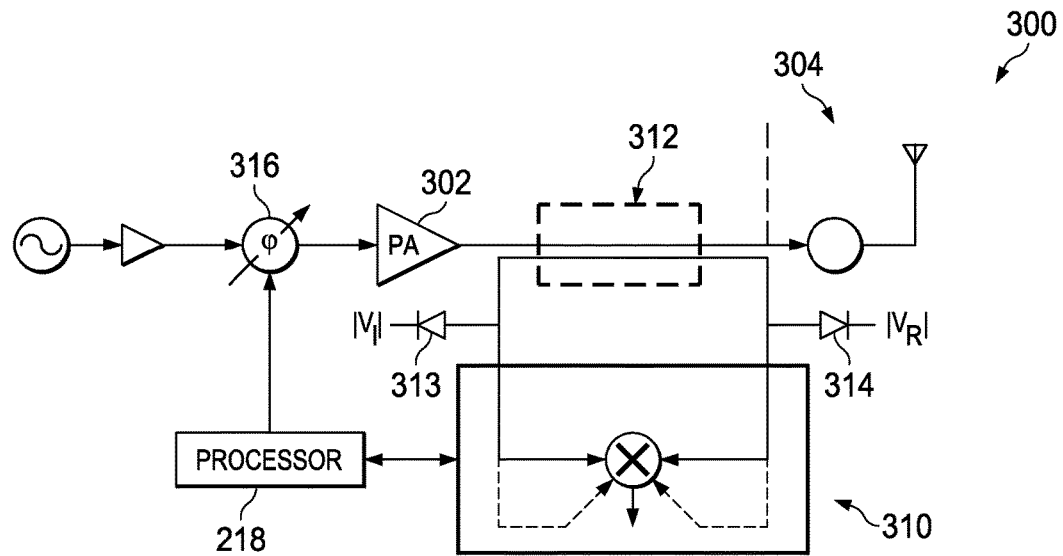
FIG. 3 is a schematic diagram of an embodiment of a transmission circuit that enables complex impedance measurements between a power amplifier and an antenna.

FIG. 3 is a schematic diagram of an embodiment of a transmission circuit 300 that enables complex impedance measurements between a microwave output and a receiver. The impedance measuring devices and methods described with reference to FIG. 3 are applicable to microwave devices other than radars. In the embodiment of FIG. 3, the output stage is a power amplifier 302 and the receiver is an antenna 304 of a radar. The transmission circuit 300 may be substantially similar to the transmission circuit 202 of FIG. 2 with the addition of an impedance detector 310. For example, the circuit 300 includes a phase shifter 316 that generates a phase-shifted signal to the power amplifier 302 as described above. The impedance detector 310 includes a bi-directional coupler 312 that separates forward and reflected waves between the power amplifier 302 and the antenna 304. The forward waves are sometimes referred to as the incident signal Vi and the reflected waves are sometimes referred to as the reflected signal Vr. The impedance detector 310 may also include or be coupled to a first power detector 313 that measures the magnitude of the incident signal |Vi| and a second power detector 314 that measures the magnitude of the reflected signal |Vr|. The power detectors 313 and 314 are shown as being diode based detectors; however other embodiments of the detectors 313 and 314 may be implemented. The impedance detector 310, or a device coupled thereto, determines the phase of the reflection coefficient $\Gamma$ by making two measurements with 0 and 90 degree phase shifts between the incident and reflected signals Vr and Vi. The phase information along with the magnitude of the incident signal Vi and the reflected signal Vr is transmitted to the processor 218 or another device that determines or measures the reflection coefficient $\Gamma$ based on this information.

As described above, the power detectors 313 and 314 measure the magnitudes of the incident signal |Vi| and the reflected signal |Vr|. The ratio of the magnitude of the reflected signal |Vr| to the magnitude of the incident signal |Vi| yields the magnitude of the reflection coefficient |$\Gamma$|. The phase difference $\theta$ between the incident signal Vi and the reflected signal Vr can be determined or measured by the circuits and methods described herein. In order to resolve the phase ambiguity that is inherent in cosine measurements used to determine the phase $\theta$ of the reflection coefficient $\Gamma$, a phase shift of 0° and +/−45 degree may be implemented on the incident and reflected signals Vi and Vr so as to obtain quadrature measurements with 0 degree and 90 degree phase shifts between the incident and reflected signals Vi and Vr. These quadrature measurements enable the phase $\theta$ of the reflection coefficient $\Gamma$ to be calculated.

Figure 4:
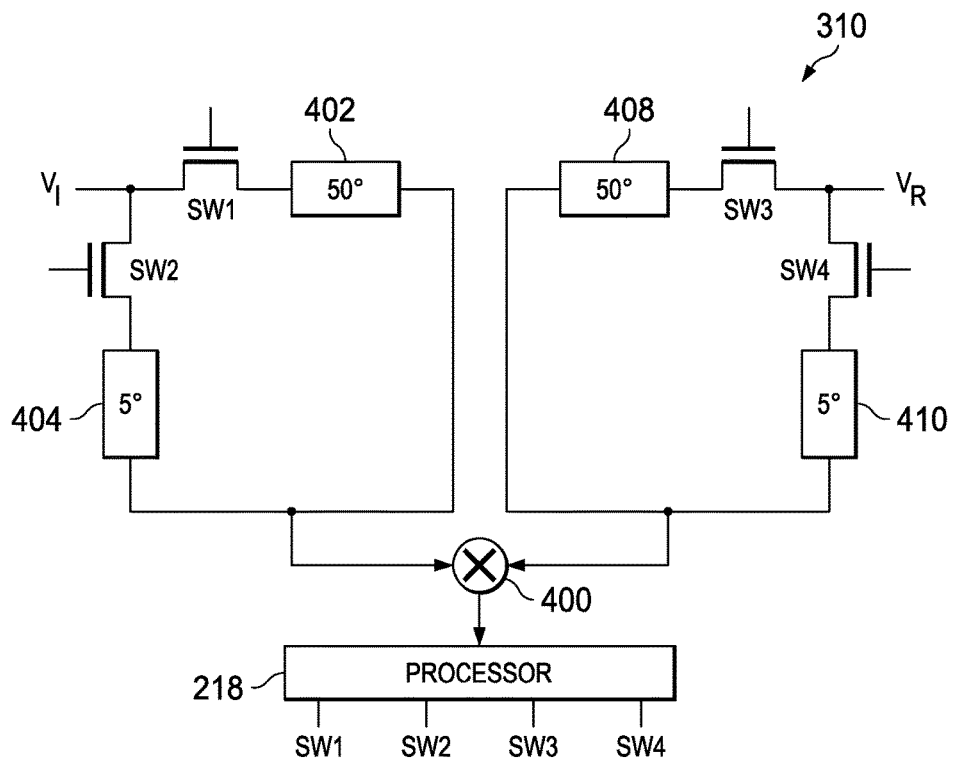
FIG. 4 is a schematic diagram of an embodiment of the phase detector of FIG. 3.

A more detailed embodiment of the phase detector 310 is shown in FIG. 4. The phase detector 310 has two inputs, one for the incident signal Vi and one for the reflected signal Vr. The incident signal Vi is coupled to a first switch SW1 and a second switch SW2, which may be electronic switches such as field effect transistors. The first switch SW1 couples the incident signal Vi to a mixer 400 by way of a long transmission line 402 that causes a phase shift in the incident signal Vi, which in the example of FIG. 4 is approximately fifty degrees. The second switch SW2 couples the incident signal Vi to the mixer 400 by way of a short transmission line 404 where a smaller phase shift in the incident signal Vi results. In the example of FIG. 4, the short transmission line 404 causes a phase shift of five degrees in the incident signal Vi. The lengths of the transmission lines 402 and 404 are chosen to provide a net 45 degree phase shift between two measurement states as described below. The transmission lines may cause different phase shifts so long as their difference is 45 degrees. The phase shifts are referenced as $\beta$ in the equations described below.

The reflected signal Vr is coupled to a third switch SW3 and a fourth switch SW4. The third switch SW3 couples the reflected signal Vr to the mixer 400 by way of a long transmission line 408 that induces the same phase shift in the reflected signal Vr as the long transmission line 402 induces in the incident signal Vi. The fourth switch SW4 couples the reflected signal Vr to the mixer 400 by way of a short transmission line 410 that induces the same phase shift in the reflected signal Vr as the short transmission line 404 induces in the incident signal Vi. In some embodiments, the phase angles are induced in the incident signal Vi and the reflected signal Vr by techniques other than transmission line lengths. In the embodiment of FIG. 4, the mixer 400 is a passive device, which enables the phase detector 310 to draw little power during its operation.

The states of the switches SW1-SW4 are controlled by the processor 218 or a similar device that is capable of turning the switches SW1-SW4 on and off. The processor 218 or similar device analyzes the output of the mixer 400 and the magnitudes of the incident and reflected signals Vi and Vr to determine the angle θ of the reflection coefficient Γ. Four quadrature calculations based on the output of the mixer 400 and the magnitudes of the incident and reflected signals Vi and Vr are made to determine the angle θ. The four calculations are defined as equations 1-4 as follows:

$$\text{Vout\_01} = K|Vi||Vr|\cos(\theta) \quad \text{Equation 1}$$

$$\text{Vout\_02} = (K/\alpha^2)|Vi||Vr|\cos(\theta) \quad \text{Equation 2}$$

$$\text{Vout\_n45} = (K/\alpha)|Vi||Vr|\cos(\theta-\beta) \quad \text{Equation 3}$$

$$\text{Vout\_p45} = (K/\alpha)|Vi||Vr|\cos(\theta+\beta) \quad \text{Equation 4}$$

where α is related to the attenuation constant of the transmission lines 402-410 in the phase detector 310 and K is the conversion gain of the mixer 400. The angle β is the phase difference induced by the transmission lines, which may be 45 degrees.

There are six unknown variables, Vi, Vr, K, α, β, and θ, and six equations or measurements, equations 1-4 and the measurements of |Vi| and |Vr|. It is noted that in some embodiments, β is not known exactly, but it can be calculated using the equations 1-4. Accordingly, all the variables, including the phase θ of the reflection coefficient Γ can be readily determined. The measurements for equations 1-4 are made by appropriately setting the states of the switches SW1-SW4 and measuring the output of the mixer 400. In equations 1 and 2, there is zero phase shift, which is achieved by activating the same length transmission lines for both the incident signal Vi and the reflected signal Vr, so the net phase shift is zero. For example, the measurements for equation 1 can be performed with switches SW1 and SW3 off and switches SW2 and SW4 on, which results in a net zero phase shift. Likewise, the measurement for equation 2 can be performed with the switches SW1 and SW3 on and the switches SW2 and SW4 off. The processor 218 or other processing device can determine the constants K and a by equations 1-4. For example, the constant α can be calculated by dividing equation 2 by equation 1. Because |Vi| and |Vr| are measured by power detectors, the constant K can be calculated from equations 3 and 4. The six measurements, four from the mixer 400 and two from the magnitudes of the incident and reflected signals Vi and Vr also allow estimations in case the differences between the "short" and "long" transmission lines are not exactly 45 degrees.

The measurement for equation 3 is performed with switches SW2 and SW3 on while switches SW1 and SW4 are off, which results in a net negative β degree phase shift. The measurement for equation 4 is performed with switches SW1 and SW4 on while switches SW2 and SW3 are off, which results in a net positive β degree phase shift. In some embodiments, the angle β is forty-five degrees. The difference between the β phase shifts is ninety degrees, which provides quadrature measurements for unambiguous determination of the phase angle θ of the reflection coefficient Γ. As described above, the phase difference of the long and short transmission lines may not equal forty-five degrees. In these situations, the phase angle θ of the reflection coefficient Γ can still be estimated based on equations 1-4. In some embodiments, only the long transmission lines 402 and 408 induce phase shifts, which may be 45 degrees, so the phase shifted signals are mixed with the incident and reflected signals.

The impedance detector 310 and the methods of using the impedance detector 310 enable the determination of complex impedance and absolute power delivered by the power amplifier 302 in a single circuit. The power measurement of the incident signal Vi provides an estimate of the absolute power delivered by the power amplifier 302 to the antenna 304. The power detection can be implemented using a passive diode based envelope detector, which provides an estimate of the peak voltage generated by the passive diode. When the detector is embedded in an impedance-matched system, such as a 50 Ω system which may exist within the bi-directional coupler 312, the RMS value of the generated voltage provides a direct estimate of the absolute power output by the power amplifier 302. The use of phase shifters allows resolution of the ninety degree ambiguity inherent in phase detection using a mixer. The passive mixer used in this proposal allows for a passive impedance detection circuit with very low power consumption. In some embodiments, the mixer 400 is a linear mixer.

The example circuits described above are implemented in radar transmitters. However, the circuits and methods described herein may be implemented in other circuits having microwave transmissions between two stages. For example, other circuits having power amplifiers transmitting to microwave receivers may have and implement the above described circuits and methods.

Figure 5:
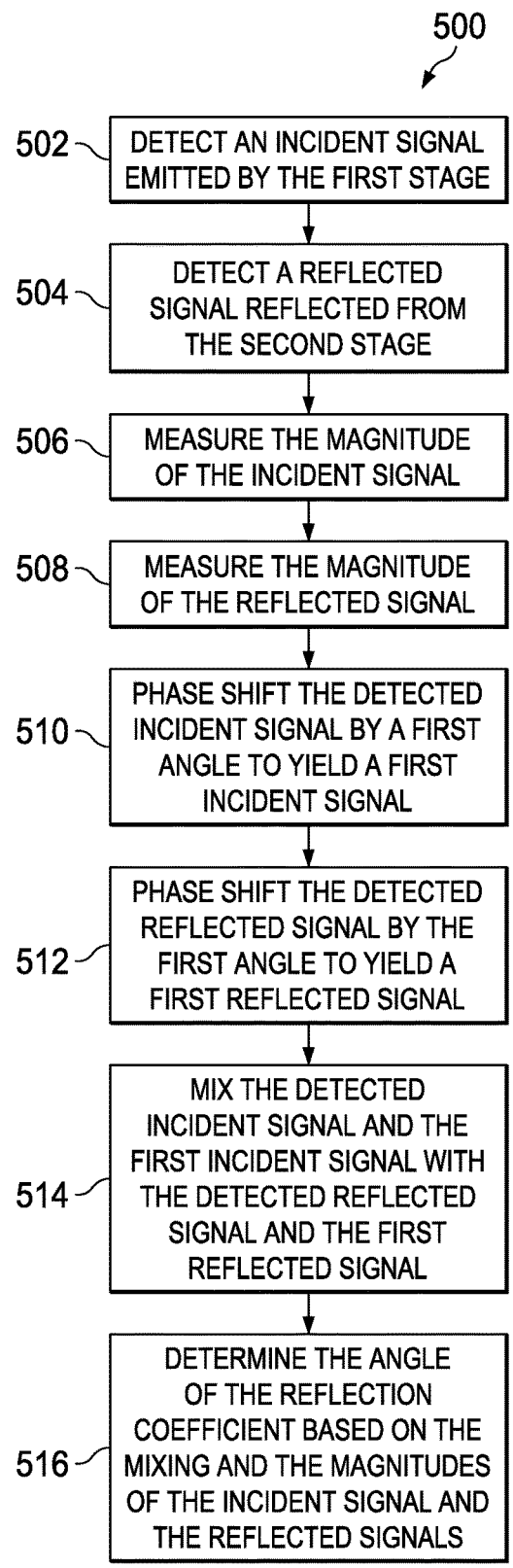
FIG. 5 is flow chart describing an example method for determining the complex impedance between a first stage and a second stage in a microwave system implementing the phase detector of FIG. 3.

An example method for determining the complex impedance between a first stage and a second stage in a microwave system implementing the phase detector 310 is shown by the flow chart 500 of FIG. 5. The flow chart 500 includes detecting an incident signal emitted by the first stage at step 502 and detecting a reflected signal reflected from the second stage at step 504. The method further includes measuring the magnitude of the incident signal at step 506 and measuring the magnitude of the reflected signal at step 508. The detected incident signal is phase shifted by a first angle to yield a first incident signal at step 510 and the detected reflected signal is phase shifted by the first angle to yield a first reflected signal at step 512. In step 514, the detected incident signal and the first incident signal are mixed with the detected reflected signal and the first reflected signal. In step 516, the angle of the reflection coefficient is determined based on the mixing and the magnitudes of the incident signal and the reflected signals.

While some examples of microwave systems have been described in detail herein, it is to be understood that the inventive concepts may be otherwise variously embodied and employed and that the appended claims are intended to be construed to include such variations except insofar as limited by the prior art.

What is claimed is:

1. A method for determining a complex impedance between a first stage and a second stage in a microwave system, the method comprising:
   detecting an incident signal emitted by the first stage;
   detecting a reflected signal reflected from the second stage;
   measuring a magnitude of the detected incident signal;
   measuring a magnitude of the detected reflected signal;
   phase shifting the incident signal by a first angle to yield a first incident signal;

phase shifting the reflected signal by the first angle to yield a first reflected signal;

mixing the first incident signal with the first reflected signal to produce a mixed signal; and determining by a processor a phase angle of a reflection coefficient in response to the mixed signal.

2. The method of claim 1 further comprising calculating a magnitude of the reflection coefficient based on a ratio of the magnitude of the reflected signal and the magnitude of the incident signal.

3. The method of claim 1 further comprising determining a complex impedance between the first stage and the second stage based on the phase angle of the reflection coefficient.

4. The method of claim 1 further comprising:

phase shifting the incident signal by a second angle to yield a second incident signal; and phase shifting the reflected signal by the second angle to yield a second reflected signal.

5. The method of claim 1, comprising determining by the processor the phase angle of the reflection coefficient in response to the magnitude of the detected incident signal and the magnitude of the detected reflected signal.

6. The method of claim 4, wherein the mixing comprises:

mixing the first incident signal with the first reflected signal to yield a first mixed signal;

mixing the second incident signal with the second reflected signal to yield a second mixed signal;

mixing the first incident signal with the second reflected signal to yield a third mixed signal; and mixing the second incident signal with the first reflected signal to yield a fourth mixed signal.

7. The method of claim 6, wherein:

the first mixed signal has a net zero phase shift;

the second mixed signal has a net zero phase shift;

the third mixed signal has a net negative forty-five degree phase shift; and the fourth mixed signal has a net positive forty-five degree phase shift.

8. The method of claim 6 wherein a mixer for mixing the first and second incident signals with the first and second reflected signals has a conversion gain and wherein the phase shifters have an attenuation constant, the method further comprising:

multiplying the first mixed signal by the conversion gain;

multiplying the second mixed signal by the conversion gain and dividing the second mixed signal by the attenuation constant squared;

multiplying the third mixed signal by the conversion gain and dividing the third mixed signal by the attenuation constant; and multiplying the fourth mixed signal by the conversion gain and dividing the fourth mixed signal by the attenuation constant.

9. The method of claim 1, wherein the first stage is a power amplifier.

10. The method of claim 1, wherein the second stage comprises an antenna.

11. The method of claim 1, wherein phase shifting comprises transmitting the signals through a transmission line having a predetermined length.

12. A circuit for determining a complex impedance between a first stage and second stage of a microwave system, the circuit comprising:

a bi-directional coupler coupled between the first stage and the second stage, the bi-directional coupler for separating incident signals generated by the first stage and reflected signals reflected from the second stage;

a phase detector coupled to the bi-directional coupler for determining the phase between the incident signal and the reflected signal;

a first power detector for measuring the magnitude of the incident signal;

a second power detector for measuring the magnitude of the reflected signal; and a processor for determining a phase angle of a reflection coefficient in response to the phase between the incident signal and the reflected signal and the magnitudes of the incident signal and the reflected signal.

13. The circuit of claim 12, wherein the phase detector comprises:

a first phase shifter coupled between the bi-directional coupler and a mixer for inducing a first phase shift of a first incident signal;

a second phase shifter coupled between the bi-directional coupler and the mixer for inducing a second phase shift of a second incident signal;

a third phase shifter coupled between the bi-directional coupler and the mixer for inducing a third phase shift of a first reflected signal; and a fourth phase shifter coupled between the bi-directional coupler and the mixer for inducing a fourth phase shift of a second reflected signal.

14. The circuit of claim 13, wherein:

one of either the first phase shifter or the second phase shifter couples the bi-directional coupler to the mixer; and one of either the third phase shifter or the fourth phase shifter couples the bi-directional coupler to the mixer.

15. The circuit of claim 13, further comprising:

a first switch coupled in series with the first phase shifter;

a second switch coupled in series with the second phase shifter;

a third switch coupled in series with the third phase shifter; and a fourth switch coupled in series with the fourth phase shifter.

16. The circuit of claim 13, wherein the phase shifters comprise respective lengths of transmission line.

17. The circuit of claim 13, wherein a difference between the first phase shift and the second phase shift is forty-five degrees.

18. The circuit of claim 13 wherein the first and third phase shifters induce a fifty degree phase shift and the second and fourth phase shifters induce a five degree phase shift.

19. The circuit of claim 12, wherein the bi-directional coupler comprises:

a first transmission line having a first length and a first switch coupled in series between the bi-directional coupler and a mixer, the first transmission line for inducing a first phase shift into the incident signal;

a second transmission line having a second length and a second switch coupled in series between the bi-directional coupler and the mixer, the second transmission line for inducing a second phase shift into the incident signal;

a third transmission line having the third length and a third switch coupled in series between the bi-directional coupler and the mixer, the third transmission line for inducing the first phase shift into the reflected signal; and a fourth transmission line having the fourth length and a fourth switch coupled in series between the bi-directional coupler and the mixer, the fourth transmission line for inducing the second phase shift into the reflected signal.

20. A radar comprising:

an antenna element;

an output stage coupled to the antenna element for driving signals to be transmitted from the antenna element;

a bi-directional coupler coupled between the output stage and the antenna element, the bi-directional coupler separating an incident signal generated by the output stage and a reflected signal from the antenna element;

a phase detector coupled to the bi-directional coupler for determining a phase between the incident signal and the reflected signal;

a first power detector for measuring a magnitude of the incident signal;

a second power detector for measuring a magnitude of the reflected signal; and a processor for determining a phase angle of a reflection coefficient in response to the phase between the incident signal and the reflected signal and the magnitudes of the incident signal and the reflected signal.

21. The radar of claim 20, wherein the phase detector comprises:

a first phase shifter coupled between the bi-directional coupler and a mixer for inducing a first phase shift of a first incident signal;

a second phase shifter coupled between the bi-directional coupler and the mixer for inducing a second phase shift of a second incident signal;

a third phase shifter coupled between the bi-directional coupler and the mixer for inducing the first phase shift of a first reflected signal; and a fourth phase shifter coupled between the bi-directional coupler and the mixer for inducing the second phase shift of a second reflected signal.

* * * * *